UNITED STATES PATENT OFFICE 2,317,999

QUATERNARY AMMONIUM COMPOUNDS

Friedrich Leuchs, Wuppertal-Elberfeld, Germany, assignor to Winthrop Chemical Company, Inc., New York, N. Y., a corporation of New York No Drawing. Application May 28, 1940, Serial No. 337,579. In Germany May 11, 1939

9 Claims. (Cl. 260—561)

This invention relates to quaternary ammonium compounds which display dispersing, bactericidal and fungicidal properties.

In accordance with the present invention new quaternary ammonium compounds distinguished by a dispersing, disinfecting and preserving action are obtainable by the manufacture of quaternary ammonium compounds of the following general formula

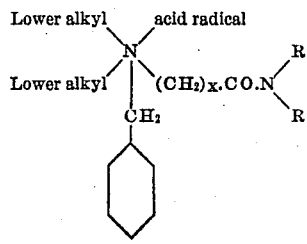

in which X stands for the integer 1 or 2 at least one R stands for a higher molecular aliphatic hydrocarbon radical, the other R standing for hydrogen and the aromatic nucleus is substituted by at least one substituent of the group consisting of alkyl, alkoxy, halogen and nitro. Preferably aliphatic hydrocarbon radicals of 8–18 carbon atoms come into consideration as higher molecular aliphatic radicals. The higher molecular aliphatic hydrocarbon radical may contain substituents such as the hydroxy group, alkoxy and amino groups and halogen atoms or the said radicals may be interrupted by other atoms such as etherlike bound oxygen and sulfur atoms or in the form of amino groups by nitrogen atoms. It may be mentioned that when using the term "higher molecular aliphatic radical" in the specification and the appended claims it is intended to include also the said substitution products or the radicals which are interrupted by etherlike bound oxygen or sulfur atoms or in the form of amino groups by nitrogen atoms. The alkyl groups substituting the quaternary nitrogen are preferably lower alkyl groups such as methyl, ethyl, propyl, isopropyl, butyl group etc. As regards the bactericidal action the compounds are especially active which contain one of the above mentioned substituents in p-position of the aromatic nucleus.

The ammonium compounds thus obtainable are in part crystalline, in part thickly liquid substances which in general dissolve in water. They are practically odorless and relatively non-toxic for men and have proved suitable for the most various preserving and disinfecting purposes. For instance, they may be employed for the disinfection of all kinds of table utensils, storage utensils. They are further advantageously used for disinfecting medical instruments, all articles used in dressing wounds, for disinfecting laundry and so on. Floors and walls may likewise be disinfected by means of the new quaternary ammonium compounds. Also foodstuffs such as fruits, vegetables, meat etc. may be preserved or disinfected.

The new compounds may also be used in dilution with hard water without diminution of their activity. In the concentration necessary for disinfection they do not injure the skin and therefore may also be used for the disinfection of the skin, particularly the hands. As they do not irritate on mucous membranes which are especially sensitive, they may be added to gargles, toothpastes and so on for imparting them antiseptic properties.

The new quaternary compounds may be used in substance as well as in solution or emulsion or in admixture with each other and/or with other active or inert substances.

The new quaternary ammonium compounds specified above may be prepared according to the methods known per se, for instance, by reacting upon a halogenacyl amide having linked to the nitrogen atom of the amide group a higher molecular aliphatic hydrocarbon radical or a hydroaromatic hydrocarbon radical with a tertiary amine containing a benzyl radical which is substituted by at least one substituent of the group consisting of alkyl, alkoxy, halogen and nitro. Another way for preparing the new quaternary ammonium compounds consists in treating aminoacyl amides, the amino group of which is in the tertiary state and which contain, linked to the nitrogen atom a higher molecular aliphatic hydrocarbon radical or a hydroaromatic hydrocarbon radical with alkylating or aralkylating agents. When the nitrogen atom of the amino group is not substituted by a benzyl radical carrying at least one of the groups alkyl, alkoxy, halogen and nitro a reactive ester of the benzyl alcohol must be chosen for this reaction substituted by one of the groups alkyl, alkoxy, halogen and nitro.

Furthermore it may be started from carboxylic acids or reactive derivatives thereof such as esters or halides carrying a quaternary ammonium group which is substituted by a benzyl radical to which is linked at least one substituent of the groups alkyl, alkoxy, halogen and nitro. Carboxylic acids or their reactive derivatives of this kind may be transformed according to the usual methods with the aid of higher molecular aliphatic hydrocarbon radicals or hydroaromatic hydrocarbon radicals containing amines into the corresponding acid amide compounds.

A further way for manufacturing the new compounds is as follows: It is started from ammonium acyl amide compounds as specified above but the aromatic nucleus of which being unsubstituted. A substituent of the groups alkyl, alkoxy, halogen and nitro is then introduced into the benzyl radical by transforming a suitable substituent or by a direct method.

It is also possible to act with acid amides containing a quaternary ammonium group as specified above and carrying in the amide group at least one hydrogen atom in the presence of basic condensing agents upon reactive esters of higher molecular aliphatic alcohols or hydroaromatic alcohols such as the halides or sulfuric acid esters.

The following examples illustrate my invention without, however, restricting it thereto the parts being by weight.

Example 1

250 parts of a 39% alcoholic dimethyl amine solution are added to 261.5 parts of chloroacetyl-dodecylamide (obtainable by reacting dodecylamine with chloroacetyl chloride in the presence of pyridine or dimethylamine, melting point 61–63° C.). The mixture is heated to 90–100° C. in a closed vessel. When distilled at 2 mm. pressure the dimethylaminoacetyl-dodecyl-amide, boiling point 170–172° C./2 mm. and melting point 39–41° C. is obtained from the reaction mixture.

171.5 parts of p-nitrobenzyl chloride are added at water bath temperature on 270 parts of the aforesaid product. The p-nitrobenzyl-dimethyl-ammonium chloride-N-acetyl-dodecylamide is obtained which, recrystallized from acetone or acetic ester, melts at 132–134° C. It is easily soluble in water.

The same product may be obtained in the following manner:

180 parts of p-nitrobenzyldimethylamine are allowed to react with, 261.5 parts of chloroacetyl-dodecylamide at water bath temperature with stirring. The p-nitrobenzyl-dimethyl-ammonium chloride-N-acetyl dodecylamide is obtained in a crystalline form.

The product kills colibacteria in the concentration of 1: 30000 and staphylococci in the concentration of 1: 40000 within 2.5 minutes.

Example 2

391 parts of p-nitrobenzyl-methylaminoacetyl dodecylamide (obtainable from p-nitrobenzyl-methylamine and chloroacetyl-dodecylamide and purified by means of the hydrochloric acid salt, melting point 223° C. from alcohol) are heated to 50° C. with 50.5 parts of chloromethyl in a closed vessel. The p-nitrobenzyl-dimethyl-ammonium chloride-N-acetyl dodecyl-amide, obtainable according to this way, is identical with the product described in Example 1. If instead of chlormethyl bromomethyl or methyl iodide are used, the corresponding bromide or iodide with similar properties may be obtained.

Example 3

270 parts of dimethylamino-acetyl-dodecylamide are heated with 140.5 parts of p-methylbenzyl chloride to 90° C. With evolution of heat the p-methylbenzyl-dimethyl-ammonium chloride-N-acetyl dodecylamide is obtained. It melts, when recrystallized from acetic ester, at 153–155° C.

The product kills colibacteria in the concentration of 1: 20000 and staphylococci in the concentration of 1: 80000 within 2.5 minutes.

Example 4

270 parts of dimethylamino-acetyl-dodecylamide are reacted with 161 parts of p-chlorobenzyl chloride. After heating to 80–85° C. with stirring, the temperature rises to 105–110° C. As reaction product the p-chlorobenzyl-dimethyl-ammonium chloride - N - acetyl - dodecylamide (melting point 150° C. from acetone) is obtained.

The product kills colibacteria in the concentration of 1: 15000 and staphylococci in the concentration of 1: 45000 within 2.5 minutes.

In a corresponding manner the p-methoxybenzyl - dimethyl-ammonium chloride - N - acetyl - dodecylamide (melting point 137–139° C.) is obtained by replacing the p-chlorobenzyl-chloride by 156.5 parts of p-methoxybenzyl chloride.

The product kills colibacteria in the concentration of 1: 20000 and staphylococci in the concentration of 1: 30000 within 2.5 minutes.

If instead of the dodecyl amide of the dimethyl-amino-acetyl the amides are used formed with other higher molecular aliphatic or hydroaromatic amines such as, for instance, decyl-amide, tetradecylamide, hexadecylamide or mixtures thereof, products of similar properties are obtained. Likewise one or more methyl groups may be replaced by other alkyl radicals.

Example 5

275.5 parts of chloroacetyl-methyl-dodecylamide (obtainable from chloroacetyl chloride and technical methyl-dodecylamine in the presence of pyridine, boiling point 190–200° C. at 3 mm. pressure) are reacted with 169.5 parts of o-chlorobenzyl-dimethylamine at water bath temperature. A semisolid mass is obtained, easily soluble in water and representing essentially the o-chlorobenzyl-dimethyl-ammonium chloride-N-acetyl-methyl-dodecylamide.

Example 6

261.5 parts of chloroacetyl-dodecylamide are mixed with 204 parts of m,p-dichlorobenzyl-dimethylamine and heated until the reaction starts. The m,p - dichlorobenzyl - dimethyl-ammonium-chloride-N-acetyl-dodecylamide, melting point 151–152° C., is obtained.

The product kills colibacteria in the concentration of 1: 15000 and staphylococci in the concentration of 1: 40000 within 2.5 minutes.

Example 7

275.5 parts of β-chloropropionyl-dodecylamide (obtainable from β-chloropropionic acid chloride and dodecylamine in the presence of pyridine, melting point 78–80° C. from methyl alcohol) are added on 180 parts of p-nitrobenzyl-dimethylamine by heating for some time. The reaction product is dissolved in water, the undissolved parts are removed by filtration, if necessary by adding Norit, and the filtrate is evaporated. The p-nitrobenzyl-dimethyl-ammonium chloride - N-propionyl-dodecylamide thus obtained melts at 188–189° C.

I claim:

1. Water-soluble quaternary ammonium salts of the following general formula

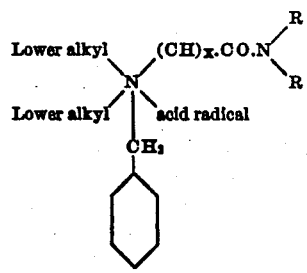

wherein X stands for the integer 1 or 2 at least one R stands for a higher molecular aliphatic hydrocarbon radical, the other R standing for hydrogen and the aromatic nucleus of the benzyl group being substituted by at least one substituent of the group consisting of alkyl, alkoxy, halogen and nitro.

2. Water-soluble quaternary ammonium salts of the following general formula

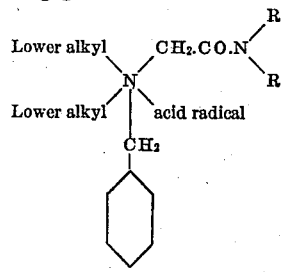

wherein at least one R stands for a higher molecular aliphatic hydrocarbon radical, the other R standing for hydrogen and the aromatic nucleus of the benzyl group being substituted by at least one substituent of the group consisting of alkyl, alkoxy, halogen and nitro.

3. Quaternary ammonium compounds of the following general formula

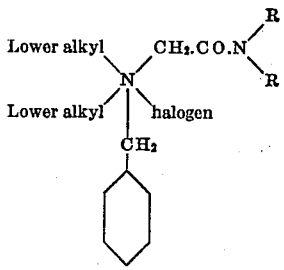

wherein at least one R stands for a higher molecular aliphatic hydrocarbon radical, the other R standing for hydrogen and the aromatic nucleus of the benzyl group being substituted by at least one substituent of the group consisting of alkyl, alkoxy, halogen and nitro.

4. Quaternary ammonium compounds of the following general formula

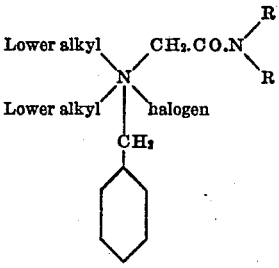

wherein at least one R stands for a higher molecular aliphatic hydrocarbon radical, the other R standing for hydrogen and the aromatic nucleus of the benzyl group being substituted by at least one substituent of the group consisting of alkyl, alkoxy, halogen and nitro in p-position.

5. Quaternary ammonium compounds of the following general formula

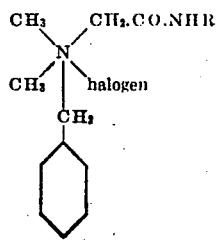

wherein R stands for a higher molecular aliphatic hydrocarbon radical and the aromatic nucleus of the benzyl group being substituted by at least one substituent of the group consisting of alkyl, alkoxy, halogen and nitro in p-position.

6. The quaternary ammonium compound of the following formula

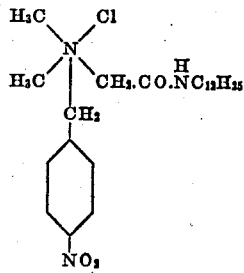

7. The quaternary ammonium compound of the following formula

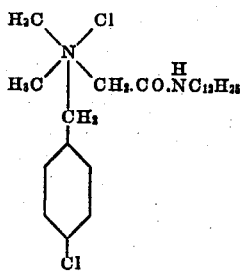

8. The quaternary ammonium compound of the following formula

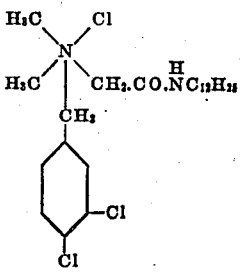

9. Quaternary ammonium compounds of the following general formula:

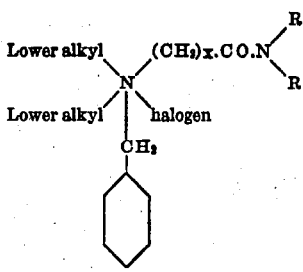

wherein X stands for an integer from 1 to 2, at least one R stands for a higher molecular aliphatic hydrocarbon radical, the other R standing for hydrogen and the aromatic nucleus of the benzyl group being substituted by at least one substituent of the group consisting of alkyl, alkoxy, halogen and nitro.

FRIEDRICH LEUCHS.